United States Patent [19]

Czirr et al.

[11] Patent Number: 4,931,649

[45] Date of Patent: Jun. 5, 1990

[54] NEUTRON COINCIDENCE CALORIMETER

[75] Inventors: J. Bart Czirr, Mapleton; Gary L. Jensen, Orem, both of Utah

[73] Assignee: Brigham Young University, Provo, Utah

[21] Appl. No.: 342,858

[22] Filed: Apr. 25, 1989

[51] Int. Cl.$^5$ ............................................. G01T 3/06
[52] U.S. Cl. ............................. 250/390.07; 250/364; 250/367; 250/390.11
[58] Field of Search .................... 250/390.07, 390.11, 250/391, 392, 364, 367

[56] References Cited

U.S. PATENT DOCUMENTS 3,566,118  2/1971  Peters ............................ 250/390.11
4,814,623  3/1989  Robertson et al. ............. 250/390.11

OTHER PUBLICATIONS

R. Aleksan et al., "Measurement of Fast Netrons in the Gran Sasso Laboratory Using a 'Li Doped Liquid Scintillator", Nuclear Instruments and Methods in Physics Research A274, (1989), 203–206.

D. M. Drake et al., "New Electronically Black Neutron Detectors", Nuclear Instruments and Methods in Physics Research A247, (1986), 576–582.

S. Ait-Boubker et al., "Thermal Neutron Detection and Identification in a Large Volume with a New Lithium-6 Loaded Liquid Scintillator", Nuclear Instruments and Methods in Physics Research A277, May 1989, 461–466.

Primary Examiner—Carolyn E. Fields
Attorney, Agent, or Firm—Foley & Lardner, Schwartz, Jeffrey, Schwaab, Mack, Blumenthal & Evans

[57] ABSTRACT

A spectrometer for MEV neutrons relies upon total energy absorption to measure neutron energy. Neutrons are thermalized in a liquid scintillator-moderator providing a first light pulse and are subsequently captured in a Li-6 glass scintillator providing a second light pulse. The light pulses are converted into first and second electronic signals by photomultipliers. A coincidence signal is required from the neutron capture prior to gating electronic circuitry for measuring the amplitude of the first electronic signal. The dual signal from a single neutron provides a mechanism for discrimination against background events arising either from gamma rays or from ambient, low-energy neutrons. The spectrometer is particularly useful in situations in which the neutron source intensity is very low.

24 Claims, 5 Drawing Sheets

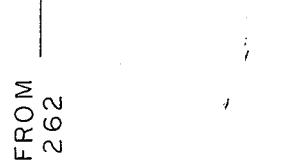

NEUTRON COINCIDENCE CALORIMETER

BACKGROUND OF THE INVENTION

The invention is directed to the field of neutron detection and measurement and particularly to the field of detection of neutron energies. The invention has special application to technologies where a relatively low neutron flux rate is observed.

Neutron detectors which measure the presence of neutrons, namely neutron flux, as opposed to energy, are known in the art. Examples of such detectors are counters or ionization chambers filled with boron containing gases such as $BF_3$ in which neutrons are detected by the production of ionizing alpha particles when the neutron reacts with boron-10. For fast neutrons, ionization chambers may also be fabricated by utilizing a hydrogenous gas and taking advantage of the elastic scattering of protons which are subsequently utilized to ionize the gas.

When neutron energy measurements are desired, as opposed to simple flux measurements, the art teaches utilization of time-of-flight methods in which the travel time of neutron pulses are measured where again the neutron is detected as the end point by means of an ionization counter.

Further, with the discovery of "cold fusion" from experiments of Steven E. Jones et al. at Brigham Young University, there is an ever increasing demand for neutron counters which can measure neutron energies at very low rates. Such counters are instrumental in confirming the existence of catalyzed fusion in which deuterons are infused into a host material with a resulting enhancement of nuclear fusion. In such systems, detection of the neutrons at the expected energies provides a measure of the reaction rate and thus energy produced. Such detectors may thus be termed calorimeters.

SUMMARY OF THE INVENTION

It is therefore an object of the invention to provide a neutron spectrometer or coincidence calorimeter which is suitable to measure neutron energies without time-of-flight techniques.

A further object of the invention is to provide a neutron spectrometer for measurements of very low neutron fluxes.

Yet another object of the invention is to provide a neutron spectrometer for use in measuring neutrons from cold fusion reactions, such as, for example, reactions utilizing electrolytic cells containing heavy water and having electrodes fabricated, for example, of Ti or Pd. In such cases, the reaction rate may be relatively small and only on the order of 0.03 neutrons per second, and the neutron detector is able to measure neutrons at a rate of ~0.0003 n/sec.

The invention is directed to a neutron detector which comprises a scintillator-moderator, a plurality of Li-6 doped glass plates positioned adjacent and preferably embedded within the scintillator-moderator, and a photodetector device mounted adjacent the scintillator-moderator.

The invention may also be characterized as a neutron spectrometer having a scintillator-moderator producing a first electromagnetic radiation pulse when an incident neutron is slowed down therein to thermal energies, a Li-6 doped material disposed adjacent or within the scintillator-moderator in which the thermal neutrons initiate a second electromagnetic radiation pulse upon reaction with the Li-6, a photodetector positioned adjacent the scintillator-moderator and Li-6 doped material for converting the first and second electromagnetic pulses into first and second electronic signals respectively, and an electronic circuit responsive to the first and second signals for measuring the energy of the incident neutron.

The invention is also directed to a method of detecting neutrons comprising the steps of generating a first electromagnetic pulse by moderating an incident neutron to thermal energies in a scintillator-moderator to produce thermal neutrons, generating a second electromagnetic pulse by neutron capture of the thermal neutrons and a Li-6 doped material, converting the first and second electromagnetic pulses into first and second electronic signals and processing the first and second electronic signals. The processing of the first and second electronic signals may further involve the steps of generating a gating signal for a fixed time when the amplitude of the second electronic signal is larger than a predetermined value, integrating the first electronic signal to produce an integrated first signal, delaying the integrated first signal by a second amount of time to produce a delayed first signal, and measuring the amplitude of said delayed first signal only during the fixed time of the gating signal.

BRIEF DESCRIPTION OF THE DRAWINGS

The invention is more particularly described in relation to the drawings wherein:

FIG. 5 shows a schematic diagram of a grounding switch utilized in accordance with the invention;

FIG. 6 illustrates a timing diagram useful in explaining the operation of FIGS. 4A and 4B; and FIG. 7 illustrates the pulse height of the electronic signals generated in the liquid scintillator by background gamma events and in the glass scintillator by neutron capture events and is useful in explaining operation of the circuit of FIGS. 4A and 4B.

DETAILED DESCRIPTION OF PREFERRED EMBODIMENTS

Figure 1:
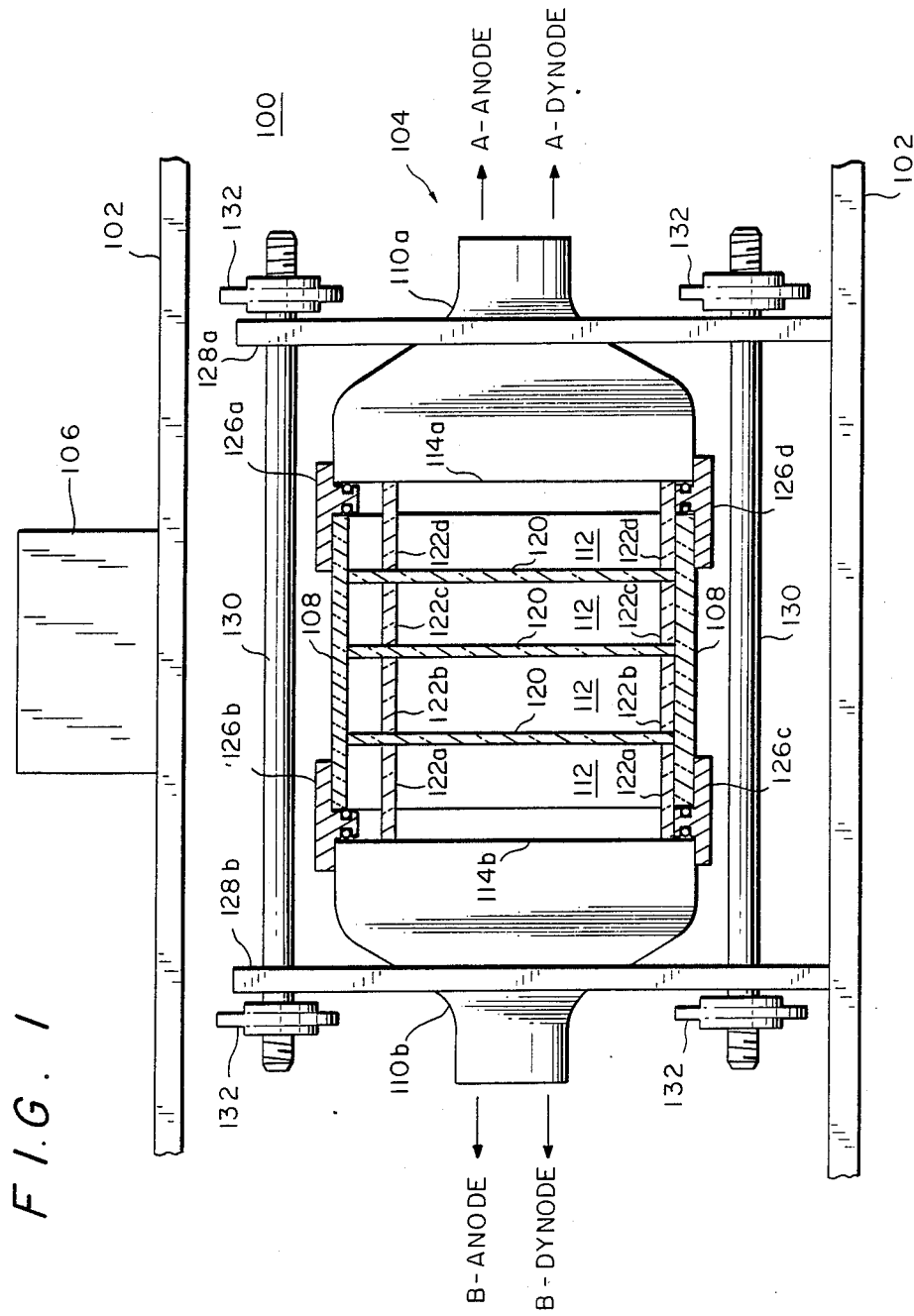
FIG. 1 shows a partially sectioned front view of the neutron detector apparatus in accordance with the principles of the invention.
Figure 3:
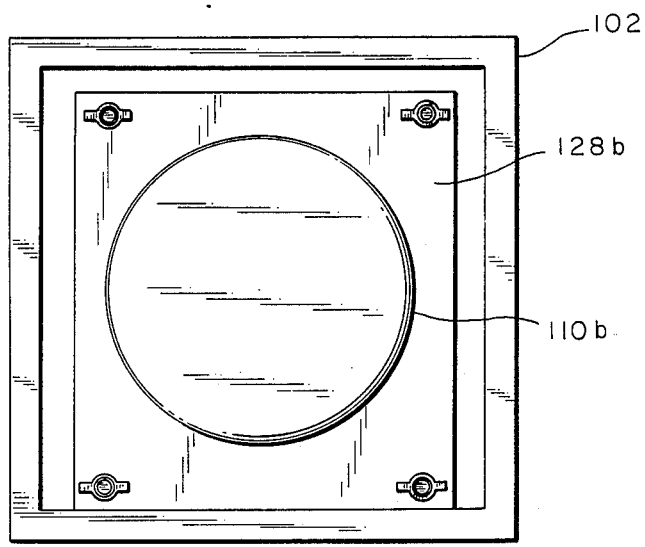
FIG. 3 shows an end view of the neutron detector apparatus of FIG. 1.

In reference to FIG. 1, there is illustrated a partially sectioned front view of a neutron detector apparatus 100 constructed in accordance with the principles of invention. The neutron detector apparatus 100 is seen to comprise an outer housing 102 which may be in the form of a rectangular box as best illustrated in FIG. 3. Contained within the outer housing 102 is a neutron detector 104 and positioned outside the outer housing 102 is a sample 106 which is to be measured utilizing the neutron detector 104. The particular construction of the neutron detector 104 is such as to permit measurements of samples 106 having a very low neutron generating rate, such as samples of electrolytic cells configured to catalyze cold fusion reactions. However, the neutron detector may be utilized in many other applications, especially where the energy of neutrons from a low neutron flux source is to be observed.

The neutron detector 104 comprises a housing 108 fabricated, for example, from a Pyrex cylinder (diameter approximately 12.5 cm and 12 cm long) and a pair of matched photomultiplier tubes 110a and 110b positioned at opposite ends of the cylindrical housing 108. (The number of photomultiplier tubes is not critical and one may employ a single photo-multiplier tube or alternately more than two tubes.) A light transparent, liquid scintillator-moderator 112 fills the housing 108 and makes physical contact with faces 114a, 114b of the photomultiplier tubes 110a and 110b respectively. A suitable scintillator-moderator liquid may be obtained from Bicron Corporation, Newbury, Ohio, as model BC-505. A similar scintillator liquid may also be obtained from Nuclear Enterprises, a subsidiary of EMI, as part NE224. These liquid scintillator-moderators are trimethylbenzene based scintillators and are particularly appropriate since they do not attack the Lucite and O-rings utilized in the detector apparatus.

Positioned within the housing 108 and immersed within the liquid scintillator-moderator 112 are a plurality of Li-6 doped glass scintillator plates 120. These glass scintillator plates may be obtained from Bicron Corporation or from Nuclear Enterprise (NE 905) and are manufactured by Levy West Ltd., Harlow, England. The percentage composition of a plate by weight is as follows:

| Percent by Weight | Compound |
|---|---|
| 57% | $SiO_2$ |
| 4% | $MgO$ |
| 18% | $Al_2O_3$ |
| 4% | $Ce_2O_3$ |
| 17% | $Li_2O$ |

Three such plates are shown in FIG. 1 although clearly a different number of plates and different arrangements thereof may be utilized. For example, the plates need not necessarily be immersed within the liquid scintillator-moderator 112 but may be more generally positioned adjacent to the liquid such as by forming an end plate of the housing 108, e.g., positioned between the photomultiplier tube faces 114 and the liquid 112. In the embodiment shown in FIG. 1, the glass plates 120 are held in a spaced apart relationship by means of a plurality of spacers 122a–122d. Each of these spacers 122a–122d is fabricated from Lucite pipe sections which may, for example, have an outside diameter of approximately 11 cm. The lower ends of each of the cylindrical spacers 122a–122d rest on the lower end of the cylindrical housing 108. The housing 108 is maintained in liquid sealing contact with the photomultiplier tubes 110a and 110b by means of a plurality of couplers 126a–126d. The two photomultipliers 110a and 110b are pressed towards one another and held in place by means of end supports 128a and 128b which are themselves pressed towards one another by means of threaded rods 130 and wing nuts 132.

Figure 2:
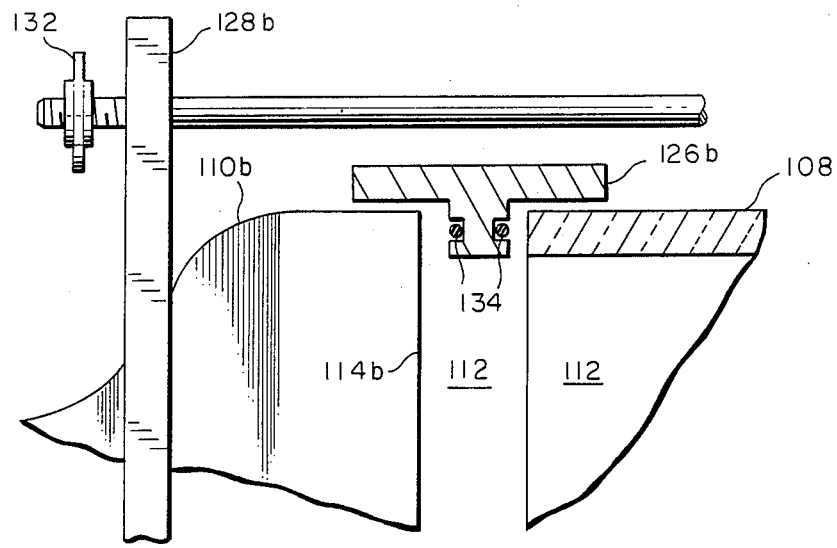
FIG. 2 shows an enlarged partially sectioned view of a portion of the coupling mechanism of the apparatus of FIG. 1.

FIG. 2 illustrates an enlarged view of coupler 126b in which there may be seen two O-rings 134 positioned within grooves on opposite sides of a projecting portion of coupler 126b so as to maintain a liquid proof seal when the photomultiplier tubes 110a and 110b are pressed towards one another. Similar O-rings 134 are positioned in each of the remaining couplers 126a–126d.

In order to enhance light collection efficiency, the outside of the cylindrical housing 108 is painted with a white reflective paint (for example, DC-620 available from Bicron Corporation).

The neutron detector 104 generates two light pulses from a single incident neutron. A first light output is produced by the moderation of the incident neutron in the liquid scintillator-moderator 112. The second light output is produced by neutron capture of the thermalized neutrons in the Li-6 doped glass scintillator plates 120. In the liquid scintillator-moderator 112, the incident neutron is slowed down to thermal energies by elastic collisions with protons within the liquid scintillator, and a large fraction of the incident energy is typically lost after 6 to 10 collisions which take place within a total time of a few nanoseconds. The integrated light from all of the protons give rise to a single light pulse which is viewed by the photomultiplier tubes. After the neutrons have slowed down within the liquid scintillator-moderator 112 to thermal energies, the thermalized neutrons are subsequently captured in the Li-6 glass scintillators and generate tritium and alpha particles causing the generation of a second light pulse in the glass scintillator plates 120. The characteristic light from the glass scintillator plates 120 provide a signature that an event occurred in which all of the energy in the neutron was deposited in the detector 104.

The electronics which processes the signals taken from the neutron detector 104 is governed by the logic requirement that only liquid events which fall within a preselected gate time prior to a pulse identified as a neutron capture event are actually counted and measured. Thus, the conditioning electronics is sensitive to the total energy of the neutron resulting in two characteristic pulses of light occurring within a predetermined coincidence time. The coincidence requirement is designed to reduce background counts resulting from gamma rays to which the liquid scintillator 112 is also sensitive. Thus, the electronics, through pulse-shape discrimination, is able to distinguish a glass-produced light event, having a relatively long decay time of about 70 nsec, from a liquid-produced event having a relatively short decay time of about 5 nsec.

Figure 4A:
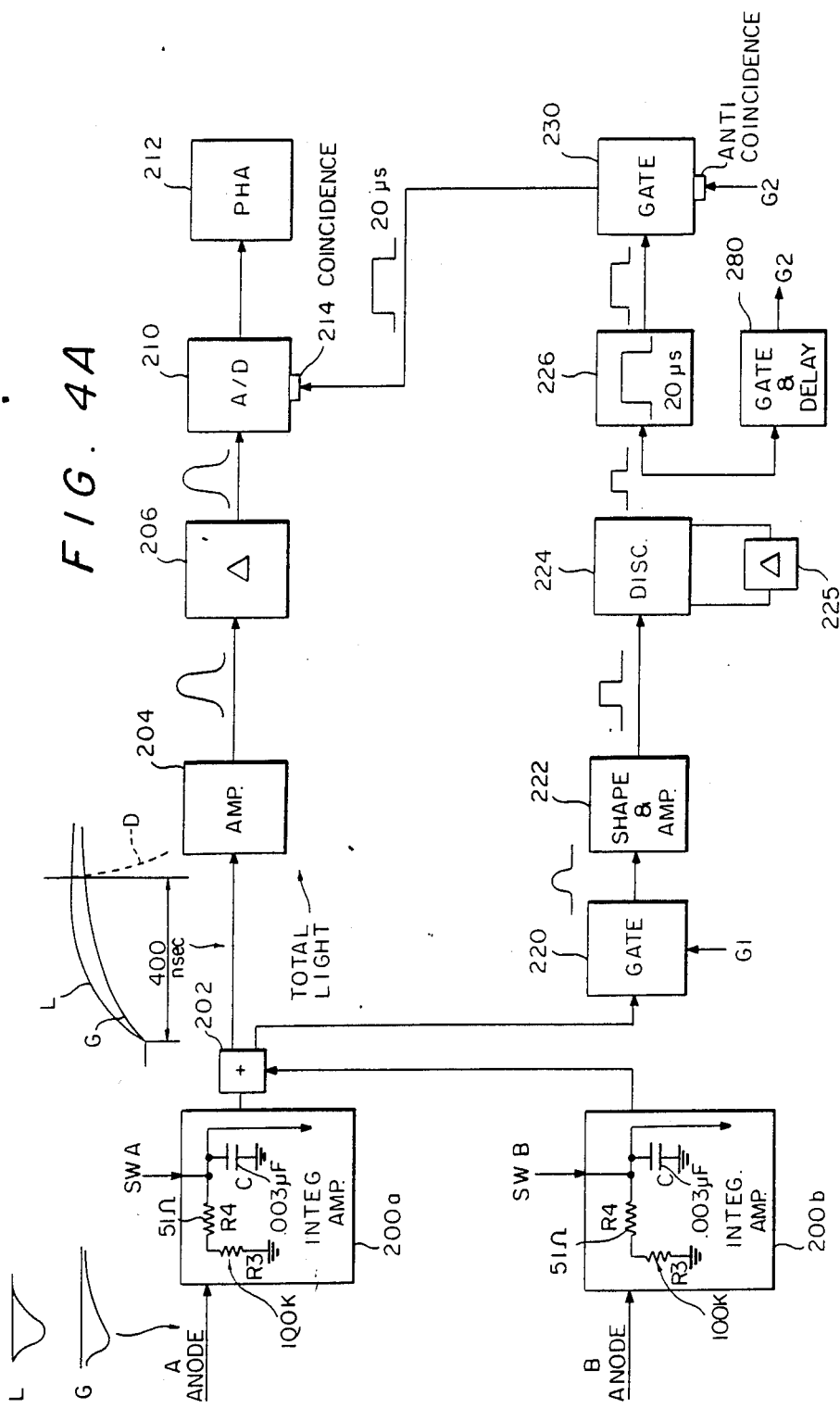
FIGS. 4A and 4B are block diagrams of the electronics utilized in accordance with the principles of invention.

Each of the photomultiplier tubes 110a and 110b produces an anode and a dynode signal. As shown in FIG. 4A, the A-anode signal from photomultiplier tube 110a is fed to an integrating amplifier 200a whereas the B-anode signal from photomultiplier tube 110b is fed to an integrating amplifier 200b. Integrating amplifiers 200a and 200b may, for example, be stretcher amplifiers AN105 supplied by EG&G. These amplifiers have been coupled to grounding switches to enhance integration time characteristics as will be explained hereinbelow. The outputs of integrating amplifiers 200a and 200b are fed to a summer 202 and the summed output is supplied to an amplifier 204 which may, for example, be an ORTEC linear amplifier model 572. The output of amplifier 204 is fed to a delay amplifier 206, as, for example, ORTEC 427A. The delay amplifier 206 supplies a 20 microsecond delay and subsequently feeds the signal to an analog to digital (A/D) converter 210. The output of the A/D converter is fed to a pulse height analyzer 212. The A/D converter 210 performs the digital conversion of the incoming analog signal from the delay amplifier 206 only upon receipt of a gating or coincidence signal fed to a coincidence input terminal 214.

The output of summer 202 is also fed to a gate 220, as, for example, a linear gate LG101 supplied by EG&G. The output of gate 220 is fed to a shaper/amplifier 222 such as ORTEC time filter amplifier model 454. The output of the shaper/amplifier 222 is in turn fed to a discriminator 224 coupled with a delay 225 of a 10 nsec period to supply a narrow output logic pulse signal to a pulse stretcher 226. The discriminator 224 may, for example, EG&G model T101 and the pulse stretcher 226 may be EG&G model GG100. The output of the pulse stretcher 226 is fed to a linear gate 230 via a 10 db attenuator, not shown. Linear gate 230 may, for example, be a logic gate and slow coincidence modules supplied by ORTEC as model 409. The output of linear gate 230 is in turn fed as a coincidence signal to the coincidence input terminal 214 of A/D converter 210.

Figure 4B:
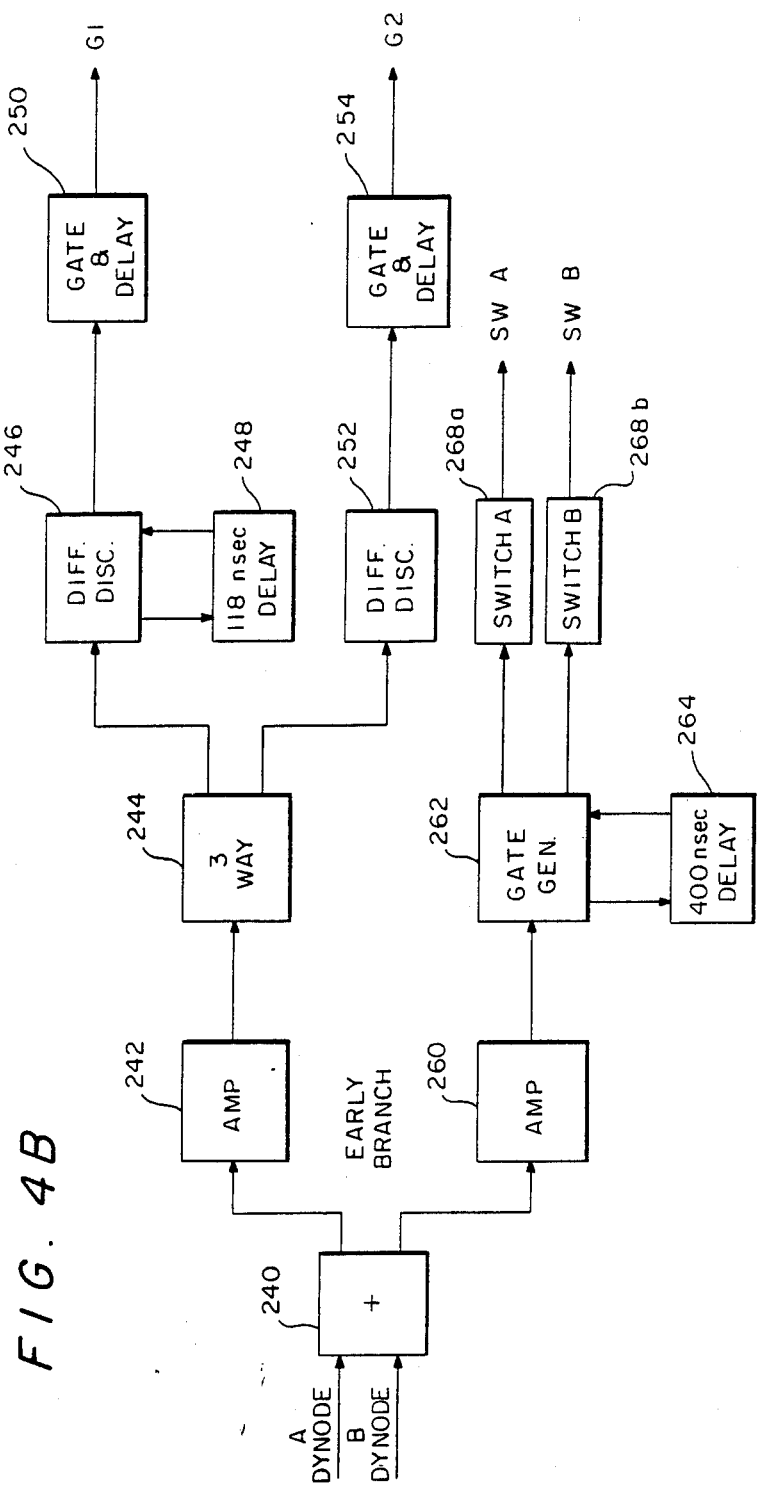

In reference to FIG. 4B, the A and B dynode outputs of photomultiplier tubes 110a and 110b respectively are fed to a summer 240 which provides a summed output to amplifier 242 which may be, for example, an ORTEC timing filter amplifier model 454. The output of the amplifier 242 is split by a three-way coupler 244 and fed to a differential discriminator 246 coupled to a 118 nsec delay 248. The differential discriminator 246 may, for example, be EG&G model TD101/N. The output of the differential discriminator 246 is fed to a gate and delay circuit 250 such as, for example, ORTEC model 416A. The output of gate and delay 250 supplies a signal along line G1 as the gating input signal to gate 220 of FIG. 4A.

The second output of three-way coupler 244 is fed to another differential discriminator 252, such as, for example, EG&G model TD101/N. The output of this differential discriminator 252 is fed to a gate and delay circuit 254, such as ORTEC model 416. The output of gate and delay circuit 254 is fed by a signal line G2 to an anti-coincidence input terminal of gate 230.

The summed output of summer 240 is also fed to an amplifier 260 which may be, for example, EG&G model AN101. The output of amplifier 260 is in turn fed to a gate generator 262 which is coupled to a 400 nsec delay 264. The gate generator 262 may, for example, be an EG&G model T101 discriminator. The output of the gate generator 262 is fed to a grounding switch 268a and to an identical grounding switch 268b. Grounding switch 268a supplies an output along signal line SW A to a conditioning input of integrating amplifier 200a. Similarly, the output of grounding switch 268b supplies a signal along signal line SW B as a conditioning signal to integrating amplifier 200b.

A schematic diagram of the grounding switches 268a and 268b is illustrated in FIG. 5. Normally conductive matched diodes provide a low impedance path to ground permitting a relative fast RC integrating time constant through the R2=51 ohm resistor of the grounding switch 268a (268b). Upon application of the 400 nsec gate signal from the gate generator 262, the switch becomes non-conductive for a set period of time (~400 nsec) thereby providing a high impedance path through the (R3)(C) (R3=100K ohm) network of the integrating amplifier 200a thus producing a relatively long integrating time on the order of 300 μsec. The ground switch is also shown in FIG. 2 of the article entitled "A New Technique for Capture and Fission Cross-Sectioned Measurements" appearing in *Nuclear Instruments and Methods*, Volume 72, pages 23–28, 1969, by J. D. Czirr, incorporated herein by reference.

In operation, the block diagram of FIGS. 4A and 4B is seen to contain a first branch (FIG. 4A) which may be termed the "total light" branch and a second branch (FIG. 4B) which may be termed the "early light" branch. In the "total light" path of FIG. 4A, the incoming light signal is fully integrated in integrating amplifiers 200a and 200b. The outputs of integrating amplifier 200a and 200b are summed in the summer 202 and subsequently amplified in amplifier 204 which also provides pulse shaping. The shaped output of amplifier 204 is delayed by a delayed amplifier 206 which provides a 20 microsecond delay prior to feeding the analog signal to the A/D converter 210. If the coincidence signal is present at the coincidence input terminal 214 of the A/D converter 210, the digital conversion takes place, and the digitized output signal is feed to the pulse height analyzer 212 thereby providing a measure of the total light energy supplied to the photomultiplier tube. As will be explained more fully hereinbelow, this total light output is proportional to the integrated output from the light pulses produced by the incident neutron in the liquid scintillator-moderator 112. Since t he light pulse produced by thermal neutrons in the glass scintillator plates 120 is constant, it need not be stored in the pulse height analyzer. As explained below, the glass event is not gated into the A/D converter 210 so it never gets digitized. Thus, a measure of the integrated light output produced in the liquid scintillator during the thermalizing of the incident neutron provides complete information as to the incident neutron energy.

The gating signal supplied to the coincidence input terminal 214 of the A/D converter 210 is generated from a second branch of the summer 202. This second branch is shown by the lower branch in FIG. 4A and comprises the gate 220, shaper/ amplifier 222, discriminator 224, pulse stretcher 226 and linear gate 230. The purpose of the above-mentioned circuits, together with certain elements of FIG. 4B, is to determine whether the incoming light was produced from the liquid scintillator-moderator 112 or from the glass scintillator 120. Inasmuch as it is only desired to store light from the liquid scintillator 112 if it is followed within a predetermined time period (20 microseconds) by a characteristic neutron capture event from the glass scintillator 120, the initial signal generated from the liquid scintillator 112 is delayed in the delay amplifier 206 to permit sufficient analysis time for the subsequently generated signal produced in the glass scintillator 120.

FIG. 4B shows the "early light" branch which is also utilized to differentiate between light generated in the liquid scintillator-moderator 112 and the glass scintillator 120. Elements at 242, 244, 246, 248 and 250 are utilized to select through pulse-shaped discrimination and amplitude criteria only those events which correspond to neutron capture in the glass scintillator 120. The output of the summer 240 is fed to the amplifier 242 which is operated with a fast integration time of 50 nsec. The term "early light" is used to characterize this branch (FIG. 4B) since the integration time of amplifier 242 is much shorter than that of amplifier 200a and 200b. The output of amplifier 242 is then fed via the three-way coupler 244 to the differential discriminator 246. This differential discriminator 246 selects a region in the pulse height of the incoming signal corresponding to glass events which have an intensity corresponding to neutron capture in the Li-6. Gamma ray background events will also fall within the selected pulse height window. However, the "total light" from these gammas will be considerably less than that from neutron capture in the glass because of the relatively longer decay time of the neutrons in the glass. Thus, even though such gammas will pass through differential discriminator 246 and gate and delay circuit 250 so as to trigger the linear gate 220 (FIG. 4A), they will be eliminated by means of the discriminator 224 which selects only a certain upper energy spectrum from the "total light" spectrum input thereto as shown in FIG. 7.

FIG. 7 illustrates the pulse height versus count spectrum which is representative of the total light provided from both glass and liquid scintillator events as a result of the gating of gate 220. This spectrum contains the neutron capture events from the glass, labelled G in FIG. 7, and the gamma background labelled L. The spectrum is fed as an input to the discriminator 224. Both of these events will pass the gate 220 since the conditioning signal along line G1 is, as explained above, set along a narrow pulse height band for the "early light" for which glass and liquid events look quite similar. However, setting the discriminator level 224 to pass only the glass events (above the dotted line Y of FIG. 7) ensures that the pulse stretcher 226 generates the 20 microsecond gating pulse to gate 230 and subsequently to coincidence terminal 214 only if the "total light" deposited in the glass scintillator 120 is above the predetermined value corresponding to neutron capture. Gamma peaks in the total light spectrum will be well below the glass peak for neutron capture in the glass scintillator 120 and thus may be effectively eliminated in the discriminator 224. In this fashion, the pulse height analyzer 212 sees only those peaks which correspond to a previously received liquid event, namely, a liquid event which is followed within 20 microseconds of a glass event characteristic of neutron capture in the glass scintillator 120.

FIG. 6 is illustrative of the timing requirements of the discrimination circuit discussed above. In particular, the "total light" output of amplifier 204 is illustrated in the upper graph of FIG. 6. It is noted in passing that the normal time spread between the generation of the light from the liquid scintillator-moderator 112 and the glass scintillator 120 is in the range of 0.1 microseconds to 50 microseconds with the majority of pulses appearing within a 20 microsecond window. Thus, the 20 microsecond coincidence requirement ensures that most events will be counted assuming that the neutron is thermalized and subsequently captured in the glass scintillator.

Referring once again to FIG. 6, the initial output of amplifier 204 corresponding to a liquid event, L, is delayed in the delay 206 so as to permit analysis of the subsequently received glass event, G. If the subsequently received "early light" glass signal passes the differential discriminator test of differential discriminator 246 and the subsequent "total light" discrimination test of discriminator 224, the second event is determined to be that of a captured neutron in the glass scintillator 120. As such, a 20 microsecond pulse is generated by the pulse stretcher 226 and passed via gate 230 to the coincident input terminal 214 of A/D converter 210. The delayed initial light, from the liquid event L, now passes from the delay 206 to the analog input of the A/D converter 210 and is subsequently digitized and stored in the pulse height analyzer 212. It is noted that the subsequent "total light" of the glass event, which is also subsequently fed to A/D converter 210 is not digitized by the A/D converter 210 inasmuch as the gating coincidence signal from gate 230 is terminated so as to inhibit operation of the A/D converter. The glass event arises from neutron capture of thermalized neutrons and thus produces a constant energy which need not be recorded since it is the same for all incident neutron energies. Thus, it is only the incident neutron energy deposited in the liquid scintillator-moderator 112 which needs to be measured and which is indicative of the neutron energy.

The data processing logic of FIGS. 4A and 4B also eliminate successive signals resulting from successive neutron captures in the glass. Such events are eliminated by means of the differential discriminator 252 (set at about the same window as differential discriminator 246) and gate and delay circuit 254 supplying an anti-coincidence signal along line G2 to the anti-coincidence input of gate 230. For example, the first neutron capture event in the glass scintillator 120 passes through differential discriminator 252 and produces the anti-coincidence signal via gate and delay circuit 254. Likewise, this same first signal passes through the differential discriminator 246 enables gate 220 and passes the first signal through the discriminator 224 and pulse stretcher 226. As such, the anti-coincidence signal G2 is fed into the linear gate 230 together with the coincidence signal from the pulse stretcher 226 thereby preventing any coincidence signal from being generated and fed to the A/D converter 210. Upon receipt of the second signal, again the anti-coincidence signal is generated at the linear gate 230 thereby blocking the delayed first signal from the delay 206 from being digitized and the A/D converter 210.

An alternate anti-coincidence circuit for eliminating successive neutron capture events in the glass may be implemented by passing the output of the discriminator 224 to a gate and delay circuit 280 (FIG. 4A) similar to the gate and delay circuit 254. The output of the gate and delay circuit 280 is in turn fed as the signal along line G2 to the anti-coincidence terminal of linear gate 230.

The resulting coincidence spectrum contains most of the valid neutron events, e.g., liquid events followed by glass events from neutron capture, plus background events which occur by accidental coincidences that are incorrectly interpreted by the electronics. The pulse-shaped discrimination is not perfect so it is possible that gamma events in the upper tail of the gamma portions of FIG. 7 occur above the discriminator level, Y, and thus cause accidental coincidences. A small fraction of the glass events can also fall below the discriminator level of FIG. 7 and are not recognized as glass events, and therefore a small glass-event peak will show up among the accidentals mentioned above. Gamma events that occur 20 microseconds or less before a glass event, but prior to neutron entry in the liquid will also be included among the accidentals.

As briefly mentioned above, the integrating amplifiers 200a and 200b may typically be EG&G stretcher amplifiers AN105. These amplifiers normally have a long integration time constant, and they have therefore been coupled to a grounding switch so as to maintain a relatively long integration rise time but produce a relatively short decay time. The purpose of the grounding switch is to rapidly restore the integrating capacitor C of the integrating amplifier 200a (200b) in preparation for receiving the next incoming pulse, while, at the same time, permitting a relatively large RC time constant for integrating the received pulses. Such an arrangement permits sufficient integration of both the liquid produced light, having a relatively short decay time of 5 nsec in the liquid, as well as the glass-produced light, having a relatively long decay time of about 70 nsec in the glass.

The negative pulse spectrum from the anode of photomultiplier tube 210a resulting from the liquid, L, and from the glass, G, are shown in FIG. 4A at the input to integrating amplifier 200a. A signal line SW A is connected to the junction of resistor R4 and capacitor C. Resistor R4 has a value of 51 ohms whereas the capacitor C, has a value of 0.003 microFarads. Resistor R3 has a value of 100K ohms. When the diodes of the ground switch are conductive, integrating amplifier 200a integrates over a time period of about 50 nsec. However, when a signal is detected in the "early light" channel of FIG. 4B, a 400 nsec pulse is delivered by the gate generator 262 to the grounding switches 268a and 268b. With the application of the 400 nsec pulse from the gate generator 262, grounding switch 268a (268b) becomes non-conductive for approximately 400 nsec which forces the integrating amplifier 200a (200b) to integrate over a larger RC time constant, e.g., 300 μsec. Removal of the 400 nsec pulse renders the grounding switch again conductive, thereby forming a fast fall time (approximately 50 nsecs) so that the integrating amplifier is ready to receive the next pulse.

A unique attribute of the spectrometer is that it has an excellent low-counting rate sensitivity that is of great benefit in special applications. The rate of accidental counts from gamma rays misinterpreted to be neutrons and ambient neutrons of cosmic-ray origin can be reduced to about 1 count per 1,000 seconds, sufficiently low that neutrons from source as weak as 100 neutrons per hour may be detected and their energy measured. Measurements indicate that ¾ of the background results from ambient neutrons and ¼ from gamma rays.

The invention has been described in reference to preferred embodiments but additional modifications and improvements will be apparent to those of skill in the art, and the invention is intended to cover such modifications and improvements which come within the scope of the appended claims.

What is claimed is:

1. A neutron spectrometer comprising:
   (a) a scintillator-moderator, said scintillator-moderator producing a first electromagnetic radiation pulse when an incident neutron is slowed down therein to thermal energies,
   (b) a Li-6 doped glass plate disposed adjacent or within said scintillator-moderator, the thermal neutrons initiating a second electromagnetic radiation pulse upon reaction with said Li-6,
   (c) photodetector means positioned adjacent to said scintillator-moderator and Li-6 doped glass plate for converting said first and second electromagnetic pulses into first and second electronic signals respectively, and
   (d) electronic circuit means responsive to said first and second signals for measuring the energy of said incident neutron.

2. A neutron spectrometer as recited in claim 1, wherein said electronic circuit means includes:
   (a) digital signal processor means including an analog-digital converter, said digital signal processor means including a coincidence terminal input for receiving a coincidence signal, and
   (b) a discrimination circuit responsive to said second signal for generating said coincidence signal when the amplitude of said second signal is greater than a predetermined value.

3. A neutron spectrometer as recited in claim 1, wherein said scintillator-moderator is a liquid scintillator-moderator.

4. A neutron spectrometer as recited in claim 1, wherein said electronic circuit means includes:
   (a) digital signal processor means including an analog-digital converter, said digital signal processor means including a coincidence terminal input for receiving a coincidence signal, and
   (b) a discrimination circuit responsive to said second signal for generating said coincidence signal when the amplitude of said second signal is greater than a predetermined value.

5. A neutron spectrometer as recited in claim 1, wherein said photodetector means comprises a photomultiplier tube.

6. A neutron spectrometer as recited in claim 2, wherein said photodetector means includes a matched pair of photomultiplier tubes.

7. A neutron spectrometer as recited in claim 2, wherein said electronic circuit means further comprises:
   (a) an integrator for receiving said first electronic signal and producing an integrated first signal;
   (b) a delayed means for delaying said integrated first signal by a set amount of time to produce a delayed first signal, and
   (c) said digital signal processor means receiving said delayed first signal and said coincidence signal and processing said delayed first signal only upon receipt of said coincidence signal.

8. A neutron spectrometer as recited in claim 7, wherein said coincidence terminal input of said digital signal processor means is included in said analog to digital converter, and wherein said analog to digital converter is enabled only upon receipt of said coincidence signal.

9. A neutron spectrometer as recited in claim 7, wherein said digital signal processor means includes a pulse height analyzer connected to an output of said analog to digital converter for providing a measurement of said incident neutron energy.

10. A neutron spectrometer as recited in claim 7, wherein said electronic circuit means further comprises means for terminating the integration of said integrator after a predetermined time so as to permit subsequent integration of subsequently received signals.

11. A neutron spectrometer as recited in claim 10, wherein said integrator comprises an integrating capacitor coupled to an RC circuit having a relatively long time constant so as to permit substantial integration of said first electronic signal, and
   said terminating means includes a grounding switch connected to said integrating capacitor and coupled with said integrating capacitor to ground in an RC circuit having a relatively short time constant so as to permit a relatively rapid fall time of said integrated first signal.

12. A neutron spectrometer as recited in claim 11, wherein said terminating means includes a logic pulse forming circuit responsive to said first and second electronic signals for generating a gating pulse having a time duration of said predetermined time, and
   wherein said grounding switch has an input responsive to said gating pulse for coupling said integrating capacitor to said relatively long time constant RC circuit only during said predetermined time.

13. A neutron spectrometer as recited in claim 7, wherein said discrimination circuit comprises a pulse stretcher for generating said coincidence signal for said set amount of time.

14. A neutron spectrometer as recited in claim 13, wherein said electronic circuit means further comprises anti-coincidence means for blocking transmission of a first coincidence signal to said digital signal processor means when a second coincidence signal is generated within a given amount of time from said first coincidence signal.

15. A neutron spectrometer as recited in claim 7, wherein:
  said photodetector means includes a matched pair of photomultiplier tubes, each photomultiplier tube generating a first and second electronic signal;
  wherein said integrator includes a first integrator means for integrating said first signal from a first of said photomultiplier tubes and a second integrator means for integrating said first signal from a second of said photomultiplier tubes, and
  wherein said electronic circuit means further includes a summer for summing outputs of said first and second integrator means to provide said integrated first signal.

16. A method of detecting the energy of a neutron comprising the steps of:
  (a) generating a first electromagnetic pulse by moderating an incident neutron to thermal energy in a scintillator-moderator to produce a thermal neutron,
  (b) generating a second electromagnetic pulse by neutron capture of said thermal neutron in a Li-6 doped glass plate,
  (c) converting said first and second electromagnetic pulses into first and second electronic signals,
  (d) processing said first and second electronic signals.

17. A method of detecting the energy of a neutron comprising the steps of:
  (a) generating a first electromagnetic pulse by moderating an incident neutron to thermal energy in a scintillator-moderator to produce a thermal neutron,
  (b) generating a second electromagnetic pulse by neutron capture of said thermal neutron in a Li-6 doped glass plate,
  (c) converting said first and second electromagnetic pulses into first and second electronic signals,
  (d) generating a gating signal for a fixed time when the amplitude of said second electronic signal is larger than a predetermined value,
  (e) integrating said first electronic signal to produce an integrated first signal,
  (f) delaying said integrated first signal by a set amount of time to produce a delayed first signal,
  (g) measuring the amplitude of said delayed first signal only during the fixed time of said gating signal.

18. A neutron detector comprising:
  (a) a scintillator-moderator,
  b) 9a plurality of Li-6 doped glass plates positioned adjacent said scintillator-moderator, and
  (c) a photodetector device mounted adjacent said scintillator-moderator.

19. A neutron detector as recited in claim 18, wherein said scintillator-moderator is a liquid and said detector further includes a housing for holding said liquid.

20. A neutron detector as recited in claim 19, wherein said photodetector device comprises a matched pair of photomultiplier tubes.

21. A neutron detector as recited in claim 20, wherein said glass plates are housed in said housing with said glass plates positioned spaced apart from one another and wholly within said liquid.

22. A neutron detector as recited in claim 21, further including light transparent spacers positioned between said glass plates and also between said glass plates and each of said pair of photomultiplier tubes.

23. A neutron detector as recited in claim 22, wherein said housing is cylindrical and said spacers comprise cylindrical pipe sections having a diameter less than the diameter of said cylindrical housing.

24. A neutron detector as recited in claim 23, further including means for securing said photomultiplier tubes in leak proof contact with said liquid.

* * * * *

UNITED STATES PATENT AND TRADEMARK OFFICE
CERTIFICATE OF CORRECTION

PATENT NO. : 4,931,649

DATED : June 5, 1990

INVENTOR(S) : J. Bart CZIRR et al

It is certified that error appears in the above—identified patent and that said Letters Patent is hereby corrected as shown below:

Column 5, line 8, after "may" insert --be--.

Column 5, line 14, "409" should read --409--.

Column 5, line 21, "454" should read --454--.

Column 5, line 28, "416A" should read --416A--.

Column 5, line 36, "416" should read --416--.

Column 5, line 68, "D." should read --B.--.

Column 8, line 59, "AN105" should read --AN105--.

Signed and Sealed this

Twenty-eighth Day of July, 1992

Attest:

DOUGLAS B. COMER

Attesting Officer     Acting Commissioner of Patents and Trademarks